United States Patent [19]

Kurokawa et al.

[11] Patent Number: 5,302,795
[45] Date of Patent: Apr. 12, 1994

[54] WELDING EQUIPMENT FOR FABRICATING A COMBUSTION LINER

[75] Inventors: Takeo Kurokawa; Yoji Akutsu; Noboru Umehara; Toshio Netsu, all of Hitachi, Japan

[73] Assignee: Hitachi, Ltd., Tokyo, Japan

[21] Appl. No.: 759,528

[22] Filed: Sep. 13, 1991

[30] Foreign Application Priority Data

Sep. 13, 1990 [JP] Japan .................. 2-242904

[51] Int. Cl.⁵ .............................. B23K 11/00
[52] U.S. Cl. .................. 219/59.1; 219/66; 228/44.3
[58] Field of Search ............... 219/59.1, 61.1, 61.11, 219/61.13, 65, 66, 67, 128, 121.63, 121.64, 121.13, 121.14, 85.19, 85.22; 228/49.3, 212, 44.3; 60/757

[56] References Cited

U.S. PATENT DOCUMENTS

| | | | |
|---|---|---|---|
| 2,424,878 | 7/1947 | Crook | 228/212 |
| 2,596,453 | 5/1952 | Weidel | 219/66 |
| 3,184,362 | 5/1965 | Litsky et al. | 228/212 |
| 3,684,149 | 8/1972 | Ambler | 228/44.3 |
| 3,702,058 | 11/1972 | De Corso et al. | 60/757 |
| 4,201,326 | 5/1980 | Connell | 228/49.3 |
| 4,206,865 | 6/1980 | Miller | 60/757 |
| 4,208,567 | 6/1980 | Reed | 219/66 |
| 4,262,487 | 4/1981 | Glenn | 60/757 |

FOREIGN PATENT DOCUMENTS

| | | | |
|---|---|---|---|
| 715293 | 8/1965 | Canada | 228/212 |
| 62-21482 | 1/1987 | Japan | 219/121.64 |
| 63-215391 | 9/1988 | Japan | 219/121.64 |
| 1-309789 | 12/1989 | Japan | |
| 2-235580 | 9/1990 | Japan | |
| 640386 | 1/1979 | U.S.S.R. | 228/49.3 |

OTHER PUBLICATIONS

English translation of Abstract of Japanese Application No. 2-235580, No Publication Date.
English Translation of Abstract of Japanese Application No. 1-309789, No Publication Date.

Primary Examiner—Geoffrey S. Evans
Attorney, Agent, or Firm—Antonelli, Terry, Stout and Kraus

[57] ABSTRACT

A combustion line, having a combustion liner body and rings welded inside the liner body, is fabricated by enlarging the diameter of each ring so that the spacing between the outer pheripheral surface of the ring and the inner peripheral surface of the liner body may fall within a predetermined range. Subsequently tacking the ring and the liner body by lap.resistance welding in the state in which the diameter of the ring has been enlarged; thereafter, brazing the rings and the liner body which have been tacked.

6 Claims, 7 Drawing Sheets

| | | |
|---|---|---|
| 1 --- LINER BODY | 33 --- LINER MOVING MOTOR | 53 --- EXPANDING ROD |
| 10 --- LINER POSITIONING MECHANISM | 34 --- RAIL | 54 --- TAPERED PORTION |
| 11 --- LINER FIXING PORTION | 40 --- RING POSITIONING MECHANISM | 57 --- EXPANDING MOTOR |
| 12 --- LINER FIXING DISK | 43 --- RING MOVING MOTOR | 70 --- SPOT WELDING MECHANISM |
| 20 --- LINER ROTATING MECHANISM PORTION | 44 --- RAIL | 71 --- FIRST SPOT ELECTRODE |
| 21 --- SLIDE TABLE | 50 --- DIAMETER ENLARGING MECHANISM | 73 --- SECOND SPOT ELECTRODE |
| 22 --- LINER ROTATING MOTOR | 51 --- EXPANDING HEAD | 75 --- THIRD SPOT ELECTRODE |
| 30 --- LINER MOVING MECHANISM PORTION | 52 --- HEAD PIECE | 80 --- TABLE |
| | 52a --- LUG | |

FIG. 1

1 --- LINER BODY
10 --- LINER POSITIONING MECHANISM
11 --- LINER FIXING PORTION
12 --- LINER FIXING DISK
20 --- LINER ROTATING MECHANISM PORTION
21 --- SLIDE TABLE
22 --- LINER ROTATING MOTOR
30 --- LINER MOVING MECHANISM PORTION
33 --- LINER MOVING MOTOR
34 --- RAIL
40 --- RING POSITIONING MECHANISM
43 --- RING MOVING MOTOR
44 --- RAIL
50 --- DIAMETER ENLARGING MECHANISM
51 --- EXPANDING HEAD
52 --- HEAD PIECE
52a --- LUG
53 --- EXPANDING ROD
54 --- TAPERED PORTION
57 --- EXPANDING MOTOR
70 --- SPOT WELDING MECHANISM
71 --- FIRST SPOT ELECTRODE
73 --- SECOND SPOT ELECTRODE
75 --- THIRD SPOT ELECTRODE
80 --- TABLE

WELDING EQUIPMENT FOR FABRICATING A COMBUSTION LINER

BACKGROUND OF THE INVENTION

1. Field of the Invention

The present invention relates to a welding method and welding equipment for welding inner cylinders to an outer cylinder. It is applicable to, for example, the fabrication of a combustion liner.

2. Description of the Related Art

Figure 4:
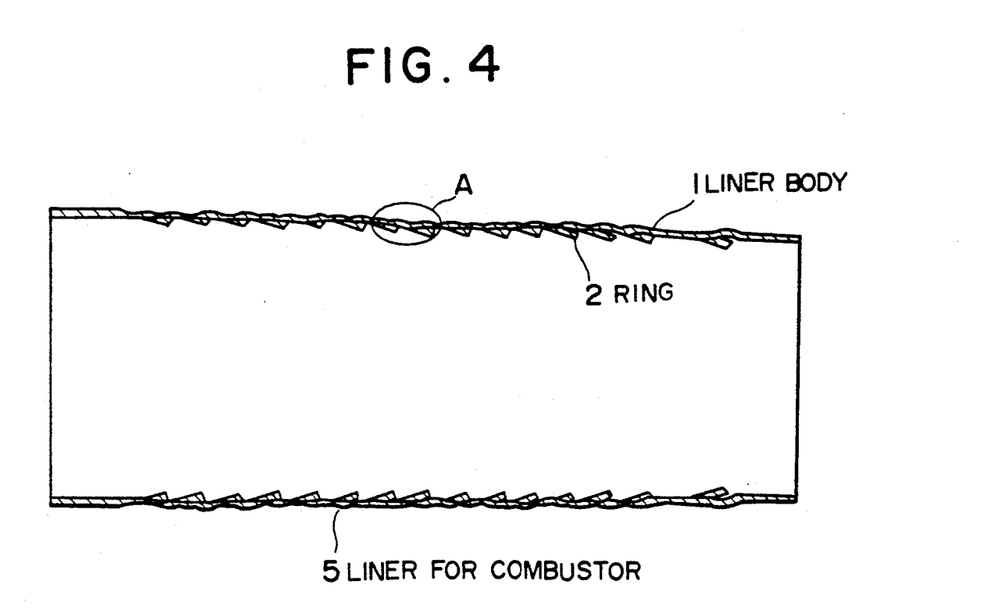
FIG. 4 is a general sectional view of a combustion liner.
Figure 5:
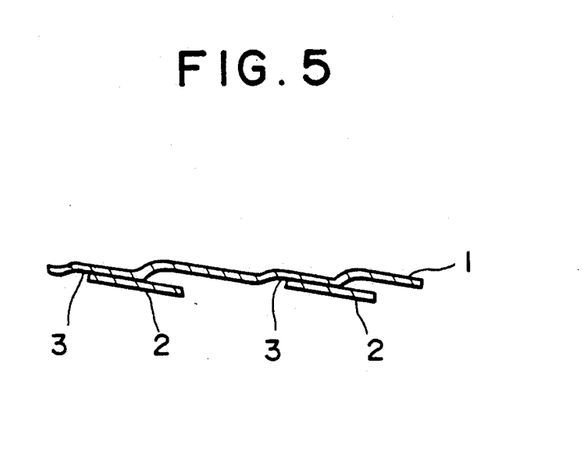
FIG. 5 is a detailed view of a part A in FIG. 4.

By way of example, a liner for a combustor in a gas turbine is fabricated by welding a liner body 1 forming an outer cylinder and rings 2 forming inner cylinders as illustrated in FIGS. 4 and 5.

The combustion liner 5 of the specified type is fabricated in such a way that the rings 2 are arranged at predetermined positions in the liner body 1, and that the liner body 1 and the rings 2 are tacked by spot welding and are thereafter brazed.

In the spot welding and the brazing, a sufficient bond strength cannot be attained unless the spacing between the inner peripheral surface of the liner body 1 and the outer peripheral surface of each of the rings 2 is within a predetermined value. Especially in the brazing operation, the brazing itself cannot be effected unless the spacing is within 0.1 mm.

For these reasons, the liner body 1 and the rings 2 have heretofore been subjected to precision machining in order that the inner peripheral surface of the former and the outer peripheral surfaces of the latter may define the appropriate spacings.

Since the precision-machined liner body and rings are used for enhancing the reliability of the welding, the prior art has had the problem that the cost of fabrication is high.

SUMMARY OF THE INVENTION

The present invention has been made in view of the problem of the prior art mentioned above, and has for its object to provide a method of fabricating a combustion liner, welding methods, and welding equipment in which precision machining is not performed for an outer cylinder or inner cylinders and which can attain a high welding reliability, together with curtailment in the cost of fabrication.

A method of fabricating a combustion liner for accomplishing the aforementioned object includes fabricating a combustion liner having a combustor liner body and rings welded inside the liner body, with the method comprising the steps of enlarging the diameter of each of the rings so that the spacing between an outer peripheral surface of the ring and an inner peripheral surface of the liner body may fall within a predetermined range; tacking said ring and the liner body by either lap resistance welding or beam welding in the state in which the diameter of said ring has been enlarged; and brazing the rings and the liner body which have been tacked.

A welding method for accomplishing the object includes welding an inner cylinder to an outer cylinder, undertaking the steps of enlarging the diameter of said inner cylinder so that the spacing between an outer peripheral surface of the inner cylinder and an inner peripheral surface of the outer cylinder may fall within a predetermined value, and that the inner cylinder may be plastically deformed; and welding the inner cylinder to said outer cylinder in the state in which the diameter of the inner cylinder has been enlarged.

Another welding method for accomplishing the object includes welding an inner cylinder to an outer cylinder, undertaking the steps of enlarging the diameter of the inner cylinder so that the spacing between an outer peripheral surface of the inner cylinder and an inner peripheral surface of the outer cylinder may fall within a predetermined value; and subjecting the inner cylinder and the outer cylinder to tack welding in the state in which the diameter of the inner cylinder has been enlarged, followed by brazing said inner cylinder and the outer cylinder.

Here, the inner cylinder should preferably be plastically deformed during the step of enlarging the diameter of the inner cylinder.

Welding equipment for accomplishing the object includes welding equipment which welds an outer cylinder and an inner cylinder, with the welding equipment comprising positioning means for coaxially arranging the outer cylinder and the inner cylinder and axially moving at least either of them; diameter enlargement means for enlarging the diameter of the inner cylinder; and welding means for welding the outer cylinder and said inner cylinder.

Besides, other welding equipment for accomplishing the object may include welding equipment which welds an outer cylinder and an inner cylinder, comprising outer cylinder positioning means for axially moving the outer cylinder to a particular position; inner cylinder positioning means for arranging the inner cylinder so as to become coaxial with the outer cylinder, and axially moving the inner cylinder; diameter enlargement means including an expanding head which has its outside diameter changed, thereby enlarging the diameter of the inner cylinder; and welding means including at least one first electrode for lap resistance welding, which is provided on an outer peripheral the of the positioned outer cylinder, and at least one second electrode for lap resistance welding, which is embedded in the expanding head and which forms a pair with the first lap resistance welding electrode, and with the welding means subjecting the outer cylinder and the inner cylinder to the lap resistance welding.

In operation, first of all, at least either of the inner cylinder and the outer cylinder is moved using the positioning means so that the inner cylinder is arranged at a predetermined position within the outer cylinder. Subsequently, the inner cylinder has its diameter enlarged by the diameter enlargement means until the spacing between the inner peripheral surface of the outer cylinder and the outer peripheral surface of the inner cylinder becomes a weldable value.

Thereafter, the inner cylinder, in the enlarged diameter state, is welded to the outer cylinder by the welding means.

Since the weld spacing is controlled by enlarging the diameter of the inner cylinder, neither the inner cylinder nor the outer cylinder needs to be precisionmachined beforehand so as to attain an appropriate weld spacing, and the cost of fabrication can be curtailed.

During this process, when the inner cylinder is plastically deformed at the stage of enlarging the diameter of this inner cylinder, the wettability thereof is enhanced to heighten the reliability of the welding. With such plastic deformation based on the diameter enlargement, the amount of deformation on the outer peripheral side of the inner cylinder is large, and the outer peripheral side of the inner cylinder requiring a high wettability can be plastically deformed deliberately.

Also, in the case where the inner cylinder and the outer cylinder are finally brazed, they are first tacked by lap resistance welding, laser beam welding or the like before the brazing. Then, a required brazing spacing can be secured without fail, and the job efficiency of the brazing can be heightened.

DETAILED DESCRIPTION OF THE PREFERRED EMBODIMENTS

Fabricated in the first embodiment shown in FIGS. 1-8 is a liner for a combustor, 5 which is constituted by a liner body 1 forming an outer cylinder and a plurality of rings 2, 2, forming inner cylinders as stated before with reference to FIGS. 4 and 5. The cylindrical liner body 1 is formed with a plurality of corrugations in the axial direction thereof. The rings 2, 2, are welded to slant faces 3, 3, which define the corrugations.

Figure 1:
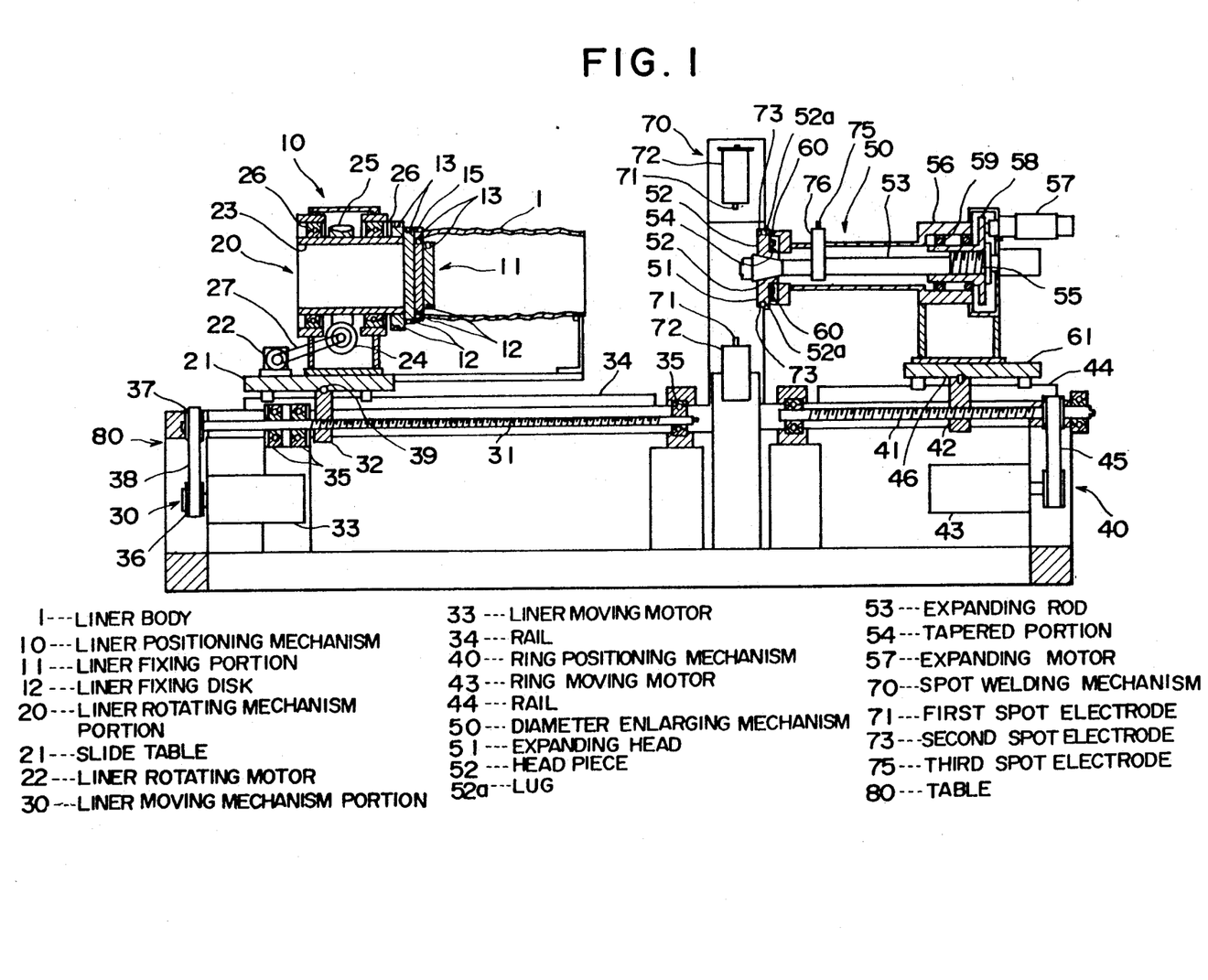
FIG. 1 is a general sectional view of welding equipment in an embodiment.
Figure 2:
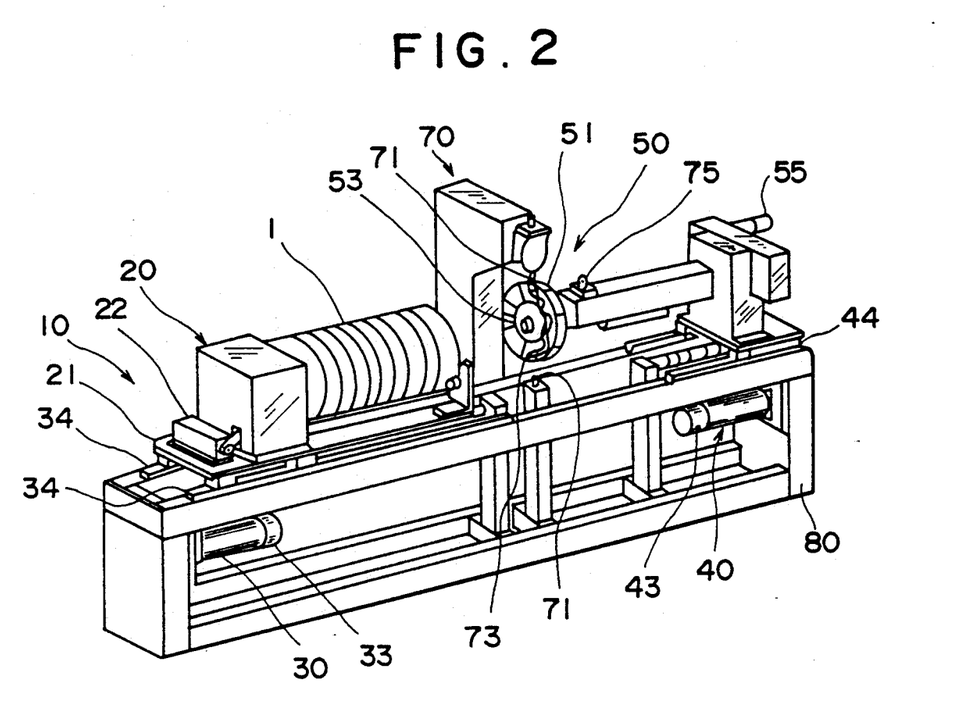
FIG. 2 is a general perspective view of the welding equipment.

As shown in FIGS. 1 and 2, the welding equipment in this embodiment is constructed of a liner positioning mechanism 10, a ring positioning mechanism 40, a diameter enlarging mechanism 50 for enlarging the diameter of each ring 2, a spot welding mechanism 70 for the spot welding between each ring 2 and the liner body 1, a table 80 for placing or supporting these mechanisms thereon, and a control device, not shown, for controlling these mechanisms.

As seen from FIG. 1, the liner positioning mechanism 10 is configured of a liner fixing portion 11 which fixes the liner body 1, a liner rotating mechanism portion 20 which rotates the liner body 1, and a liner moving mechanism portion 30 which moves the liner body 1 in the axial direction thereof.

The liner moving mechanism portion 30 includes a liner moving shaft 31 which is formed with a screw, a nut member 32 which is held in threadable engagement with the shaft 31, a liner moving motor 33 which serves to move the liner body 1, and rails 34, 34 on which a slide table 21 constituting the liner rotating mechanism portion 20 is mounted.

The liner moving motor 33 and the rails 34, 34 are fixed to the table 80. Also, the liner moving shaft 31 is fixed to the table 80 through bearings 35, 35, 35. The liner moving motor 33 and the liner moving shaft 31 are connected through a belt 38 which is extended over a pulley 36 mounted on the end part of the output shaft of the motor 33 and a pulley 37 mounted on the end part of the liner moving shaft 31.

The liner rotating mechanism portion 20 inlcudes the aforementioned slide table 21 which is carried on the rails 34, 34, a liner rotating motor 22 which serves to rotate the liner body 1, a sleeve 23 to which the liner fixing portion 11 is fixedly attached, and a worm 24 and a wheel 25 which transmit the rotation of the liner rotating motor 22 to the sleeve 23.

The slide table 21 is connected with the nut member 32 of the liner moving mechanism portion 30 through a key 39. In addition, the sleeve 23 is fixed to the slide table 21 through bearings 26, 26. The wheel 25 is snugly fitted on the sleeve 23, and the worm 24 is held in engagement with this wheel 25. In turn, the worm 24 is connected through a belt 27 to the liner rotating motor 22 which is fixed to the slide table 21.

The liner fixing portion 11 stationarily mounted on the sleeve 23 is constituted by liner fixing disks 12, 12, of various diameters in order that liners of various inside diameters may be fixed. Bolt holes or threaded holes 13, 13, are formed on the circumference of each of the liner fixing disks 12, 12.

The diameter enlarging mechanism 50 is carried on rails 44, 44 which are mounted on the table 80. This diameter enlarging mechanism 50 includes an expanding head 51 whose outside diameter can be changed, an expanding rod 53 which changes the outside diameter of the expanding head 51, a rod case 56 which covers the expanding rod 53, and an expanding motor 57 which moves the expanding rod 53.

One end of the expanding rod 53 is formed with a tapered portion 54 whose diameter enlarges toward the distal end of this portion, while the other end thereof is formed with an external thread portion 55. A rod holder 58 which transmits the rotation of the expanding motor 57 to the expanding rod 53, is held in threadable engagement with the external thread portion 55. The rod holder 58 is fixed to the rod case 56 through a bearing 59.

Figure 3:
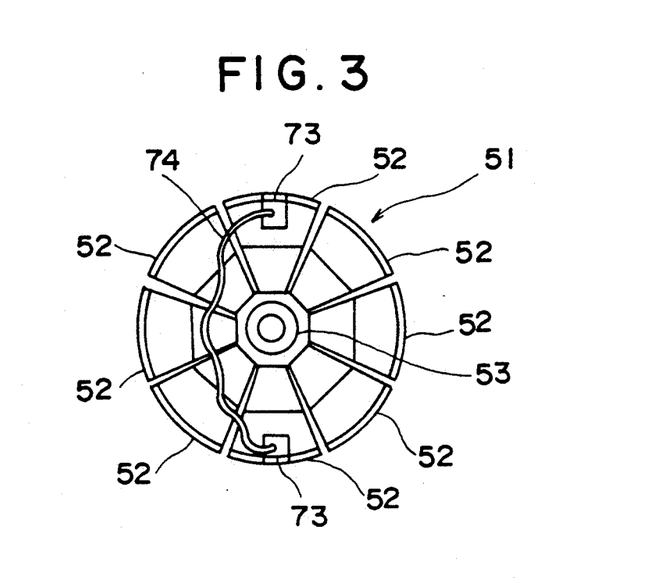
FIG. 3 is a front view of an expanding head in the embodiment.

As shown in FIG. 3, the expanding head 51 is made up of eight sectoral head pieces 52, 52. The outer periphery of the expanding head 51 is inclined in correspondence with the shape of each slant face 3 of the liner body 1, while the inner periphery thereof is inclined in correspondence with the shape of the tapered portion 54 of the expanding rod 53. Referring back to FIG. 1, the outer peripheral end of each of the head pieces 52, 52, is formed with a lug 52a which prevents the ring 2 from shifting. The expanding head 51 is mounted in the state whereby the inner peripheral surface thereof abuts on the tapered portion 54 of the expanding rod 53. The eight head pieces 52, 52, are respectively urged by springs 60, 60, retained in the rod case 56, in the directions in which the inner peripheral surfaces of these head pieces abut against the tapered portion 54 of the expanding rod 53.

The rod case 56 is fixed to a slide table 61 which is carried on the rails 44, 44.

Likewise to the liner moving mechanism portion 30, the ring positioning mechanism 40 includes a ring moving shaft 41 which is formed with a screw, a nut member 42 which is held in threadable engagement with the shaft 41, a ring moving motor 43 which serves to move the diameter enlarging mechanism 50, and the rails 44, 44 on which the slide table 61 is mounted.

The ring moving motor 43 and the ring moving shaft 41 are connected through a belt 45. The nut member 42 held in threadable engagement with the ring moving shaft 41, is connected to the slide table 61 through a key 46.

The spot welding mechanism 70 includes first spot electrodes 71, 71 which are respectively fixed to the table 80 through air cylinders 72, 72, second spot electrodes 73, 73 which are embedded in the expanding head 51 of the diameter enlarging mechanism 50, and a third spot electrode 75 which is fixed to the expanding rod 53 through an air cylinder 76. As shown in FIG. 3, the second spot electrodes 73, 73 are interconnected by a conductor 74.

Figure 6:
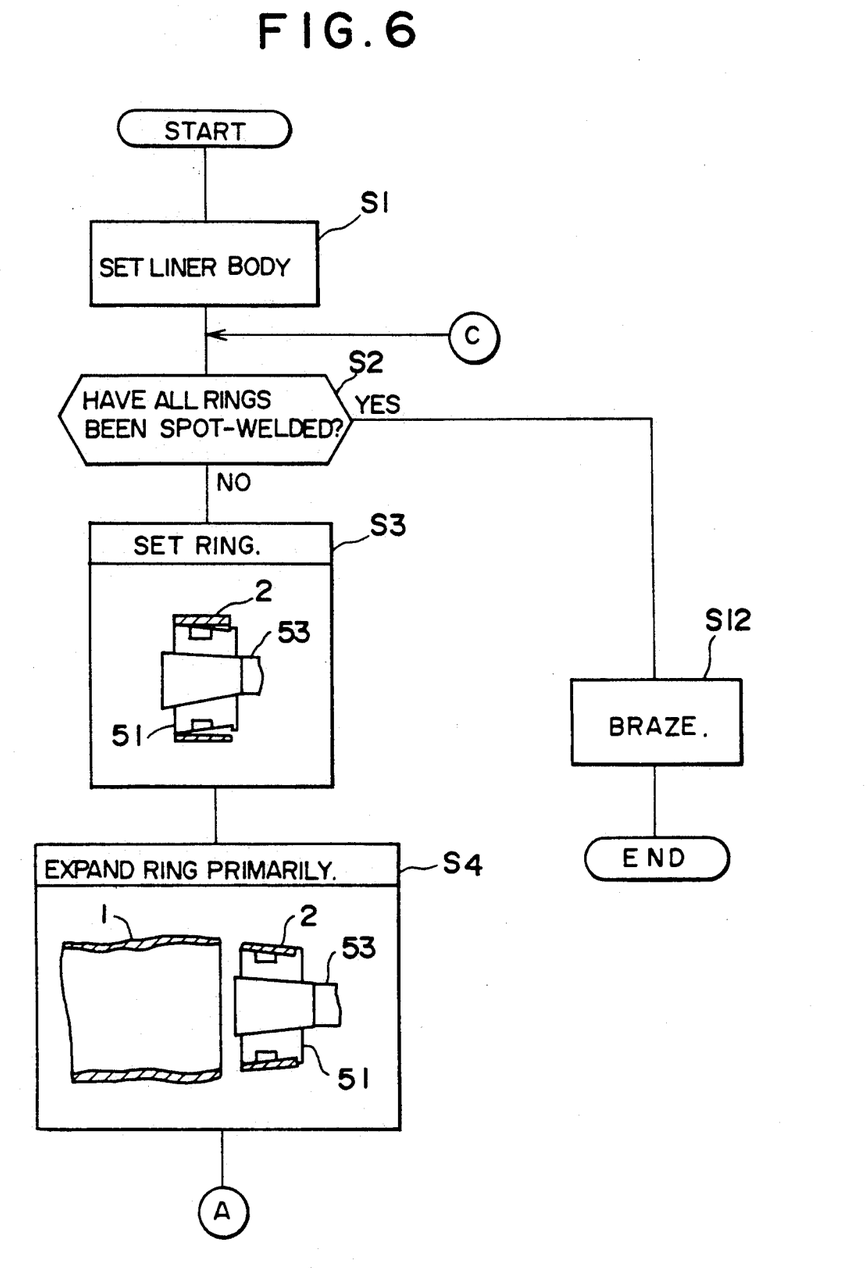
FIGS. 6-8 are flow charts showing steps for fabricating the combustion liner.
Figure 7:
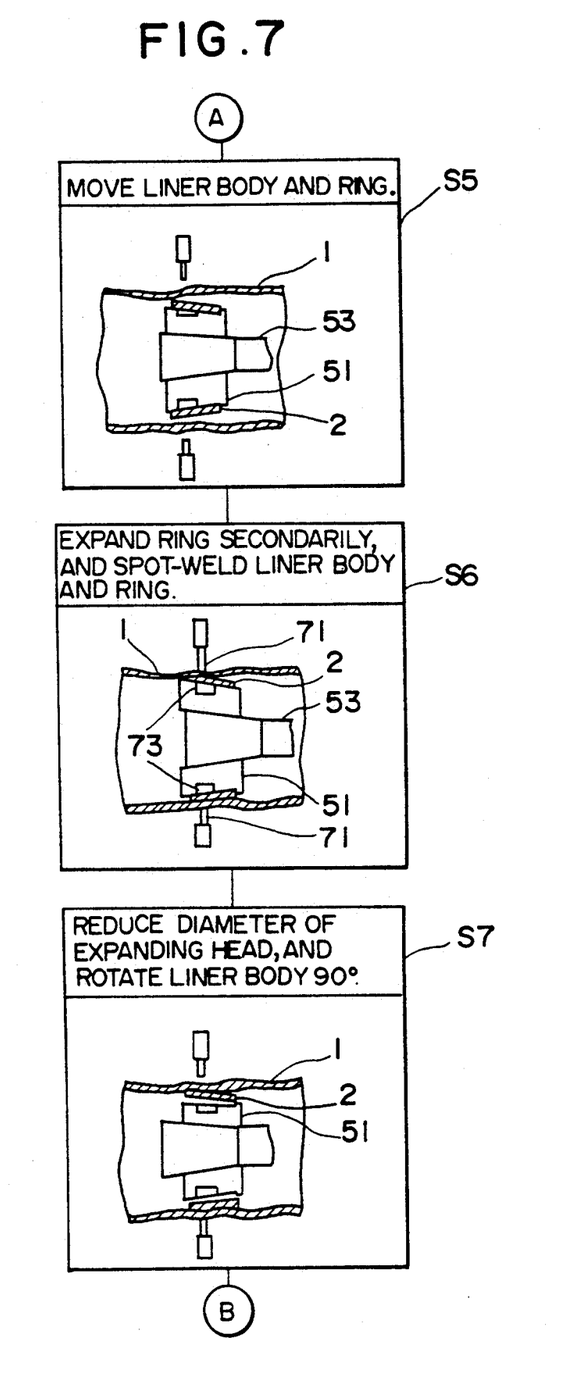
Figure 8:
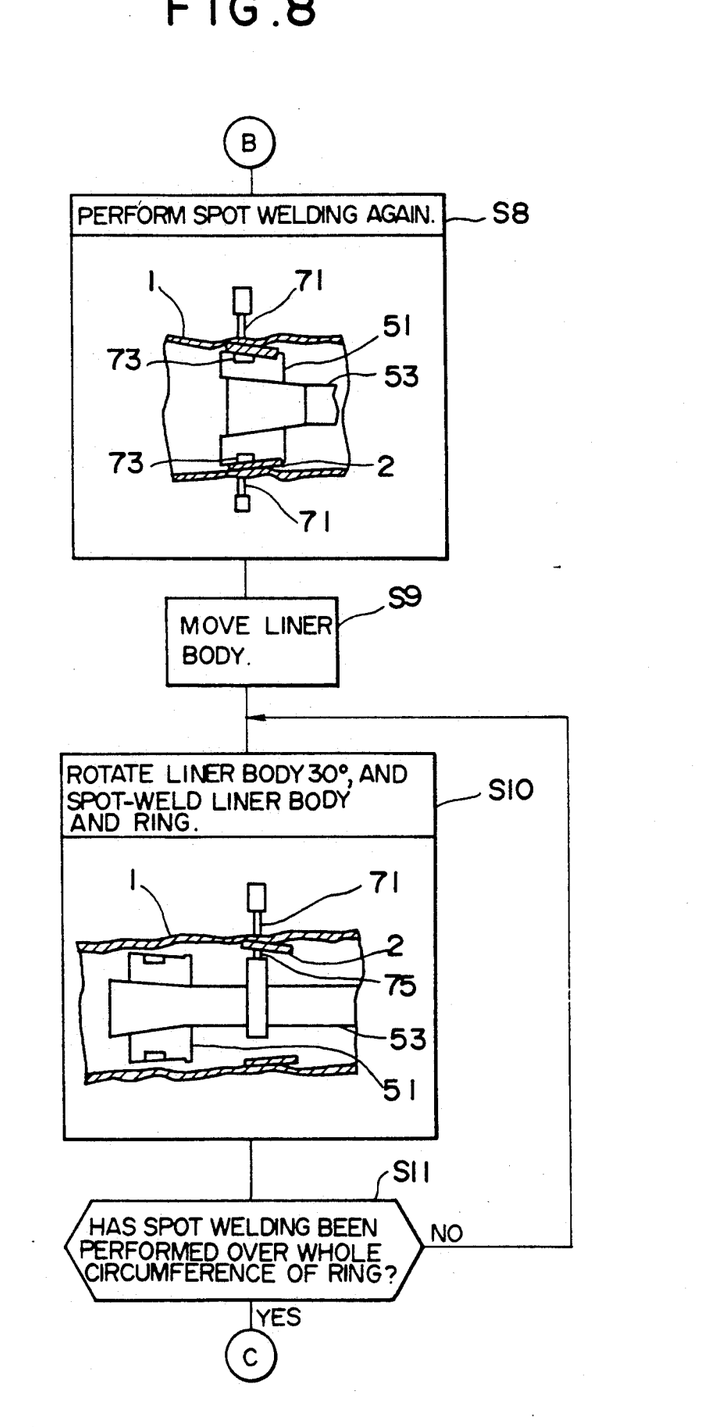

Next, the operation of the welding equipment will be described in conjunction with flow charts shown in FIGS. 6 8.

First, the liner body 1 molded into he corrugations is fixed to the corresponding one of the liner fixing disks 12 of the liner fixing portion 11 by the use of bolts 15 (step S1).

Subsequently, the ring 2 is set on the expanding head 51 (step S3).

In accordance with a command from the control device, the expanding motor 57 is driven to move the expanding rod 53 in the axial direction thereof. The expanding head 51 held in abutment with the tapered portion 54 of the expanding rod 53 has its outside diameter enlarged by the movement of the rod 53. Due to this operation, the ring 2 is primarily expanded to be completely fixed to the expanding head 51 (step S4).

Next, the liner moving motor 33 and the ring moving motor 43 are driven to move the liner body 1 and the ring 2 respectively in the axial directions thereof to a position corresponding to the first spot electrodes 71, (step S5).

This movement will be described in detail.

Upon rotation of the motors 33, 43, the shafts 31, 41 are rotated, and the nut members 32, 42, held in threadable engagement with these shafts, are axially moved. When the nut members 32, 42 are moved, the slide tables 21, 61 connected thereto through the keys 39, 46 are moved along the rails 34, 44 to move the liner body 1 and the ring 2.

At a step S6, the expanding motor 57 is driven again to enlarge the outside diameter of the expanding head 51 still more. Thus, the ring 2 undergoes secondary expansion until the spacing between the inner peripheral surface of the liner body 1 and the outer peripheral surface of this ring 2 is closed to within 0.1 mm. Herein, the ring 2 is plastically deformed by the secondary expansion. Due to the plastic deformatlon, the ring 2 is improved in its wettability with a braze. Subsequently, the air cylinders 72, 72 of the spot welding mechanism 70 are actuated to move the first spot electrodes 71, 71 until an appropriate spacing is defined between each first spot electrode 71 and the corresponding second spot electrode 73 embedded in the expanding head 51. When the spacing between the first spot electrode 71 and the second spot electrode 73 has become appropriate, current flows from transformer (not shown) to the first spot electrode 71, whereby the liner body 1 and the ring 2 are subjected to spot welding. More specifically, the current supplied to one of the first spot electrodes 71, 71 flows to the corresponding one of the second spot electrodes 73, 73 through the liner body 1 as well as the ring 2, and it flows therefrom to the other second spot electrode 73 through the conductor 74. Further, it flows to the other first spot electrode 71 through the liner body 1 as well as the ring 2. Since, in this manner, the current path of the spot welding is secured by the conductor 74, the welding current hardly branches, and so there is little loss of current.

At a step S7, the first spot electrodes 71, 71 are separated from the liner body 1 by actuating the air cylinders 72, 72, while the ring 2 and the expanding head 51 are separated from each other by reducing the outside diameter of the expanding head 51. Thereafter, the liner rotating motor 22 is driven to rotate the liner body 1 through 90°C. On this occasion, the ring 2 is rotated along with the liner body 1 becase it has been spot-welded to the liner body 1 in two places.

At a step S8, spot welding is performed again after protruding the first spot electrodes 71, 71 and enlarging the outside diameter of the expanding head 51.

When the liner body 1 and the ring 2 have been spot-welded in four places in total, the liner moving motor 33 is driven to move the liner body 1 until the welded ring 2 comes to a position corresponding to the third spot electrode 75 which is mounted on the expanding rod 53 (step S9).

At a step S10, the liner body 1 is rotated through 30°, whereupon spot welding is performed by the first spot electrode 71 and the third spot electrode 75. The use of the third spot electrode 75 instead of the second spot electrode 73 is intended to prevent the wear of this second spot electrode 73 embedded in the expanding head 51.

The step S10 is repeated until the spot welding is carried out over the whole circumference of the ring 2. When the spot welding has ended (step S11), the fabrication flow is returned to a step S2.

The steps S3 thru S11 are repeated until all the rings 2, 2, are spot-welded to the liner body 1. When this situation has been decided by the step S2, the liner body 1 and the rings 2 are brazed (step S12).

The brazing operation is carried out with a high reliability because the spacing between the inner peripheral surface of the liner body 1 and the outer peripheral surface of each ring 2 lies within 0.1 mm, also because the rings 2 have an improved wettability with the braze owing to the plastic deformation.

Regarding the combustion liner 5, a good heat transfer is required between the rings 2 and the liner body 1 in order that the heat of the combustion gas passing inside the liner 5 may be emitted out of the liner body 1 through the rings 2. For this purpose, each ring 2 and the liner body 1 needs to be reliably brazed over the whole circumference. Therefore, the technique as revealed in this embodiment is very important.

Since, in this embodiment, the weld spacing is controlled by enlarging the diameter of each ring 2, the rings 2 and the liner body 1 need not be precision-machined beforehand in order to attain the appropriate weld spacing value, the fabrication cost of the combustion liner 5 can be reduced. Besides, the appropriate weld spacing value can be attained easily and exactly, and the wettability of the rings 2 with the braze can be enhanced to heighten the reliability of the brazing operation. Further, since the spot welding is performed by the welding equipment, the time period of the job can be shortened.

Figure 9:
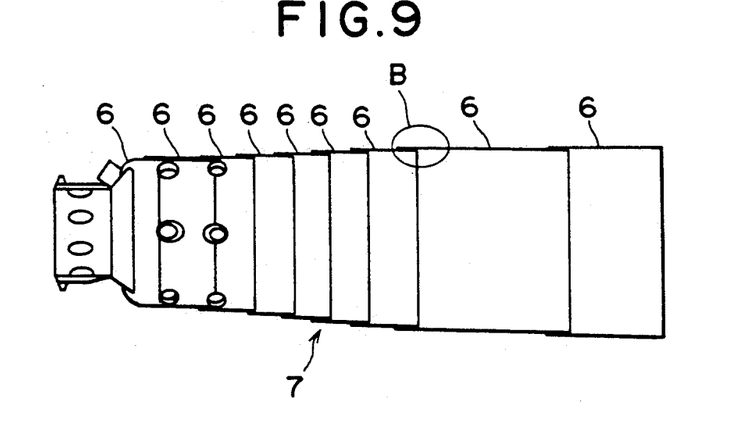
FIG. 9 is a general side view of another combustion liner.
Figure 10:
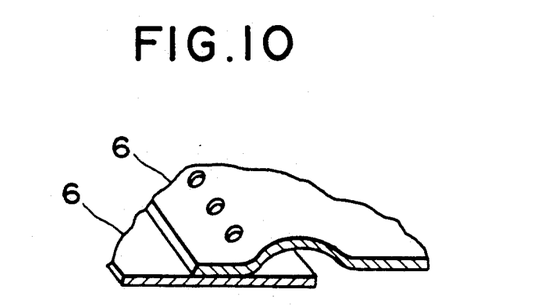
FIG. 10 is a detailed sectional view of a part B in FIG. 9.

Although this embodiment has been described for the case where the combustion liner 5 is fabricated by welding the plurality of rings 2, 2, to the liner body 1, the present invention may well be applied to a liner for a combustor, 7 which is fabricated by placing a plurality of rings 6, 6, one over another as shown in FIGS. 9 and 10. In addition, although the foregoing embodiment has exemplified the application of the present invention to the fabrication of the combustion liner 5, it is needless to say that the present invention is applicable to any device in which an inner cylinder and an outer cylinder are welded.

Besides, although the first spot electrodes 71 and the second spot electrodes 73 respectively numbering two are disposed in this embodiment, they may well be disposed in a still larger number in order to raise the efficiency of the spot welding. Moreover, the steps S6, S7 and the step S10 may well be simultaneously carried forward in such a way that an additional first spot electrode 71 is previously provided at a position corresponding to the third spot electrode 75, thereby making it possible to subject one ring 2 to the whole-circumferential spot welding (step S10) while the secondary-expansion spot welding (steps S6, S7) of another ring 2 is proceeding.

Although, in this embodiment, the spot welding has been exemplified for the tacking of the ring 2 and the liner body 1, it may well be replaced with any other welding method capable of tacking them, for example, seam welding or laser beam welding.

According to the present invention, the weld spacing between an inner cylinder and an outer cylinder is controlled by enlarging the diameter of the inner cylinder. Therefore, neither the inner cylinder nor the outer cylinder needs to be precision-machined beforehand for the purpose of attaining an appropriate weld spacing, and the cost of fabrication can be reduced.

Besides, when the inner cylinder is plastically deformed when enlarging the diameter thereof, the wettability thereof is enhanced, and the reliability of welding can be increased.

What is claimed is:

1. Welding equipment which welds an outer cylinder and an inner cylinder, comprising:
    outer cylinder positioning means for axially moving said outer cylinder to a desired position;
    inner cylinder positioning means for arranging said inner cylinder so as to become coaxial with said outer cylinder, and axially moving said inner cylinder;
    diameter enlargement means including an expanding head which has its outside diameter changed, thereby making it possible to enlarge the diameter of said inner cylinder; and
    welding means including at least one first electrode for lap resistance welding, which is provided on the outer peripheral side of the positioned outer cylinder, and at least one second electrode for lap resistance welding, which is embedded in said expanding head and which forms a pair with the first lap resistance welding electrode, said welding means subjecting said outer cylinder and said inner cylinder to the lap resistance welding.

2. Welding equipment as defined in claim 1,
    wherein said diameter enlargement means further includes an expanding rod which is movable in the axial direction of said outer cylinder, and which is formed with a tapered surface inclined to said axial direction, at a front end part of said expanding rod, and
    wherein said expanding head is formed of a plurality of head pieces into a shape of its outer peripheral side corresponding to that of an inner peripheral surface of said outer cylinder and into a shape of its inner peripheral side corresponding to that of said tapered surface, and it has its outside diameter changed by the movement of said expanding rod.

3. Welding equipment as defined in claim 1, wherein said outer cylinder positioning means includes a mechanism which rotates said outer cylinder around an axis thereof.

4. Welding equipment as defined in claim 1,
    wherein said welding means includes a plurality of such first electrodes for lap resistance welding and a plurality of such second electrodes for lap resistance welding, and
    wherein the plurality of second lap resistance welding electrodes are connected in series by a conductor.

5. Welding equipment as defined in claim 1, wherein a third electrode for lap resistance welding, which forms a pair with said first lap resistance welding electrode, is provided in a place other than said expanding head.

6. Welding equipment as defined in claim 1, wherein lugs for preventing a displacement of said inner cylinder fitted on said expanding head are formed at outer peripheral end parts of said expanding head.

* * * * *